United States Patent
Morley et al.

(10) Patent No.: US 6,205,233 B1
(45) Date of Patent: Mar. 20, 2001

(54) PERSONAL IDENTIFICATION SYSTEM USING MULTIPLE PARAMETERS HAVING LOW CROSS-CORRELATION

(75) Inventors: Richard E. Morley, Mason, NH (US); Lawrence W. Hill, Arlington, MA (US)

(73) Assignee: InvisiTech Corporation, Nashua, NH (US)

( * ) Notice: Subject to any disclaimer, the term of this patent is extended or adjusted under 35 U.S.C. 154(b) by 0 days.

(21) Appl. No.: 09/154,325

(22) Filed: Sep. 16, 1998

Related U.S. Application Data
(60) Provisional application No. 60/058,956, filed on Sep. 16, 1997.

(51) Int. Cl.$^7$ .................................................. G06K 9/00
(52) U.S. Cl. ............................................. 382/103; 382/116
(58) Field of Search .................................. 382/100, 103, 382/115, 116, 286, 276, 312, 291; 340/825.31; 348/152, 153, 154, 155

(56) References Cited

U.S. PATENT DOCUMENTS

| | | | |
|---|---|---|---|
| 3,740,466 | * 6/1973 | Marshall et al. | 348/154 |
| 4,121,192 | * 10/1978 | Wilson | 367/129 |
| 4,736,203 | 4/1988 | Sidlauskas | 340/825.34 |
| 4,975,969 | 12/1990 | Tal | 382/116 |
| 5,123,057 | 6/1992 | Verly et al. | 382/156 |
| 5,291,560 | 3/1994 | Daugman | 382/117 |
| 5,313,558 | 5/1994 | Adams | 706/20 |
| 5,375,244 | 12/1994 | McNair | 710/200 |
| 5,479,533 | 12/1995 | Tanaka | 382/161 |
| 5,499,319 | 3/1996 | Sultan et al. | 706/1 |
| 5,548,660 | 8/1996 | Lemelson | 382/116 |
| 5,576,972 | 11/1996 | Harrison | 702/128 |
| 5,577,169 | 11/1996 | Prezioso | 706/52 |
| 5,613,012 | 3/1997 | Hoffman et al. | 382/115 |
| 5,621,809 | 4/1997 | Bellegarda et al. | 382/116 |
| 5,835,641 | * 11/1998 | Sotoda et al. | 382/291 |

FOREIGN PATENT DOCUMENTS

| | | | |
|---|---|---|---|
| 2 634 570 | 1/1990 | (FR) | G06K/9/00 |

* cited by examiner

*Primary Examiner*—Andrew W. Johns
*Assistant Examiner*—Shervin Nakhjavan
(74) *Attorney, Agent, or Firm*—Weingarten, Schurgin, Gagnebin & Hayes LLP

(57) ABSTRACT

A personal identification system for use in security and various other types of pattern matching applications provides accurate recognition of a known person. This system uses a large quantity of course but inexpensive sensors to create a profile of a person seeking to enter the controlled space or to take other action. These sensors measure different statistically independent characteristics of the person, such as height, weight, stride, voice timbre, and time to perform various functions. The measurements so obtained may individually be of very low resolution. They are used to search a data base of patterns related to admissible individuals. Active agent methods are used to support learning and adaptation of the sensor set to address sensor drift and individual characteristic changes over time. A combination of many parameters will identify a person with very low probability of both false negative and false positive errors. The resulting low sensor resolution required allows such a system may be implemented at very low cost in comparison to other biometric systems.

25 Claims, 3 Drawing Sheets

PERSONAL IDENTIFICATION SYSTEM USING MULTIPLE PARAMETERS HAVING LOW CROSS-CORRELATION

CROSS REFERENCE TO RELATED APPLICATIONS

This application claims priority to U.S. provisional patent application Ser. No. 60/058,956, Filed Sep. 16, 1997, entitled "Personal Identification or Pattern Recognition System Using Multiple Sensors of Parameters with Low Cross-Correlation" and incorporated herein by reference.

STATEMENT REGARDING FEDERALLY SPONSORED RESEARCH OR DEVELOPMENT

Not Applicable.

BACKGROUND OF THE INVENTION

The invention relates generally to the field of intrusion detection and burglar alarm systems. Specifically, the methodology employed also is related to pattern recognition, fuzzy logic, and neural nets.

A personal identification system, such as that which might be employed as part of an intrusion detection mechanism, often entails pattern recognition to analyze a set of input variables with respect to a set of known values from which can be derived a match conclusion. Such pattern recognition is not as discrete as arithmetic equality, but rather analyzes the input variables and known values against an accepted tolerance of variation to determine a pattern match. A greater number of input variables and a lower accepted tolerance results improves accurate recognition, reducing false positive matches, but also increasing false negatives, which could lead to, for example, denial of an authorized party.

One prior art method for pattern recognition employs neural nets. Neural nets are specialized hardware which is connection-based, rather than the traditional rule-based platform. Such platforms utilize multiple connections between processors, rather than multiple rules applied sequentially to a single processor, to produce a result. Harrison (U.S. Pat. No. 5,576,972) utilizes multiple sensors surveying an area combined with a neural net approach to use sensor output to define a model of an area, which, if it is disturbed, signifies intrusion. Adams (U.S. Pat. No. 5,313,558) uses neural nets to apply a mathematical approach which introduces sequential events arrayed in time as a dimension of the pattern.

Other prior art pattern recognition systems utilize fuzzy logic. Sultan et al. (U.S. Pat. No. 5,499,319) describes a best-fit fuzzy logic metric oriented toward industrial control. Tanaka (U.S. Pat. No. 5,479,533) describes written or printed character recognition using fuzzy logic oriented around complex, hierarchically organized patterns. Verly et al. (U.S. Pat. No. 5,123,057) matches a list-structured hierarchy of events, and develops a metric for the degree of match.

Pattern matching systems such as those described above have been used to assess behavioral patterns. Such patterns, based on a profile which has been judged typical or symptomatic of a class of people likely to have criminal intent, are described in McNair (U.S. Pat. No. 5,375,244) which teaches a system to control access to a computer by observing various attributes of the log-on sequence, and computing the "distance" in multidimensional space from a cluster of attributes comprising the profile of legitimate users versus hackers. This approach differs from the present invention because the purpose of the measurements in the invention is to compare the resulting profile against the specific attributes of known subjects rather than merely comparing variables to a statistically determined unacceptable profile.

Also, Prezioso (U.S. Pat. No. 5,577,169) shows a system for searching a database containing information about medical insurance claims, and comparing the attributes with a pattern deemed to represent fraudulent health care providers using fuzzy logic algorithms.

Traditional intrusion detection systems such as burglar alarm systems typically sense presence, motion, and action, but do not build up a composite image to identify individuals. Authorized individuals are identified by possession of a single discrete element such as a mechanical, electronic, or magnetic card or key, or by relatively expensive techniques to measure a single characteristic such as voice signature analysis, iris shape, or fingerprint. Examples of the latter are shown in Daugman (U.S. Pat. No. 5,291,560), describing pattern recognition based on iris analysis, and Sidlauskas (U.S. Pat. No. 4,736,203), teaching three dimensional hand profile analysis. These types of systems involve relatively high costs due to the expense required to achieve precision and accuracy concerning measurement of essentially a single attribute of an individual.

BRIEF SUMMARY OF THE INVENTION

The objective of the present invention is to provide a low cost system for personal recognition. This system recognizes acceptable persons from a variety of sensory clues, which are individually of low resolution and accuracy, but which combine to form a composite picture which is seldom incorrect. Through the combination of a series of low resolution readings from multiple sensors, an exponentially increasing accuracy rate of the aggregate pattern is observed as the number of sensors increases. The system applies the mathematical strength of this exponential increase to the identification of individuals in practical settings with low cost sensor sets. Therefore, by utilizing a set of simple and inexpensive sensors, high accuracy is achieved with a low aggregate cost so as to compare favorably with competing systems currently available.

BRIEF DESCRIPTION OF THE SEVERAL VIEWS OF THE DRAWING

The invention will be more fully understood by reference to the following drawings and detailed description, of which.

DETAILED DESCRIPTION OF THE INVENTION

According to a first embodiment of the present invention, a number of sensors are arrayed to produce readings when an individual approaches. These produce readings which are individually relatively imprecise—typically, two, three, or four threshold levels, or bins, are detectable for each sensor. Low, medium, or high height, for example, can be discriminated with only two IR beams, providing input with minimal sensor cost. However, with multiple independent measurements, the ability of the system to resolve grows exponentially, so that for example, five sensors each with four thresholds of resolution produce discrimination of 1 in 1000.

Figure 1:
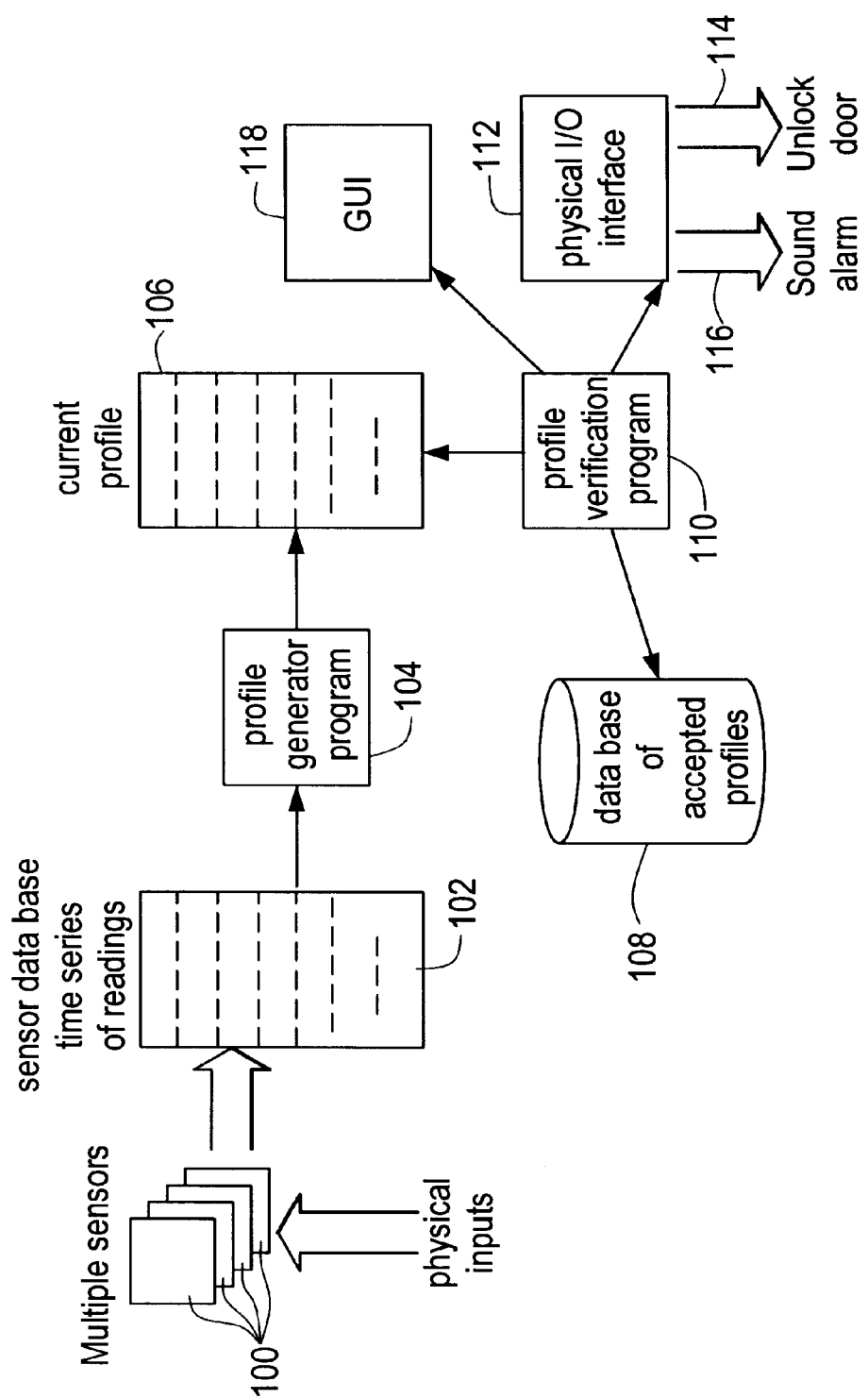
FIG. 1 is a block diagram of the system as described herein.

According to a first embodiment, depicted in the block diagram of FIG. 1, there are multiple sensors 100, each of which measures different criteria, typically parameters such as height, weight, steps per second, keystrokes per second, and time lag to insert a key. The sensor readings, of either analog values or discrete states, are read into a data base 102 of raw time stamped readings. These are in turn converted into a current subject profile 106 by a profile generator program 104. A profile is a set of values, each of which represent a different criterion for this subject. This profile is then compared against a data base of accepted profiles 108 by a profile verification program 110, and appropriate outputs are generated. These outputs are directed towards a physical I/O interface 112 such as control relays to unlock a door 114 or sound an alarm 116, or to a graphical user interface 118 such as a notification to be made to a human guard using the display of the computer system to switch video feeds and display an appropriate image.

Selection of attributes and value ranges used to denote a profile must be carefully chosen, as the accuracy of the system is assured by the selection of reliable parameters. As the system depends upon statistical independence of the criteria employed, one criteria should not determine another. Height and weight, for example, are not purely independent, and therefore should be used in combination with other criteria. Measurements which relate to learned, or environmentally dictated attributes will tend to be more independent of one another, such as time to enter a keycode, for example, or how long after a subject steps on the door mat does the subject insert the key in the door, are better, because they relate to habits created by diverse causes.

Bin threshold selection is another consideration to be carefully evaluated. Most human traits tend to follow a typical bell curve distribution. The spacing of bin boundaries should be such that the probability of occurrence of a reading in each bin is the same; unequal probability among the bins will weaken the accuracy of the system. Bins should be selected so as to place the threshold boundary values between the bins in such a way that the distribution of the population of subjects is uniformly distributed among the bins. Therefore, the population over time will generate equal numbers of readings in each of the bins.

Sensory input from such parameters may be obtained from simple, relatively inexpensive sensors. Precise accuracy is not required, as long as the reading denotes a particular bin. Typically a given parameter will discriminate between 2 and 5 bins, however, the number of bins may be varied to suit the application. While an increasing number of bins increases accuracy, it also requires sensors capable of discriminating between an increased number of threshold values.

In an ideal mathematical setting in which the bin distribution is exactly equal and the criteria parameters completely independent, the probability of a random intruder being falsely identified as matching the specific profile (e.g. matching settings read from each of the sensors), of a known authorized person is: $(1/b)^c$ where b=number of bins per criterion and c=number of criteria employed.

A typical environment, however, will involve a plurality of people whose profiles are stored, and who are routinely admitted. Their profiles are assumed to be independent of one another. An intruder matching any of them will be admitted. Now the probability of a false positive is $1-(1-(1/b)^c)^n$, where n is the number of authorized people.

This formula as applied is shown in tables I through III and shows probability for three, four, and five bins per criteria, respectively. For each table, probability values of from two to ten criteria are applied to selected increments of between 1 and 100 matching subjects. Note that for illustrative clarity, this model uses the same number of bins for each of the selected criteria, although in the actual system, the number of bins allocated to each criteria may vary.

Figure 2:
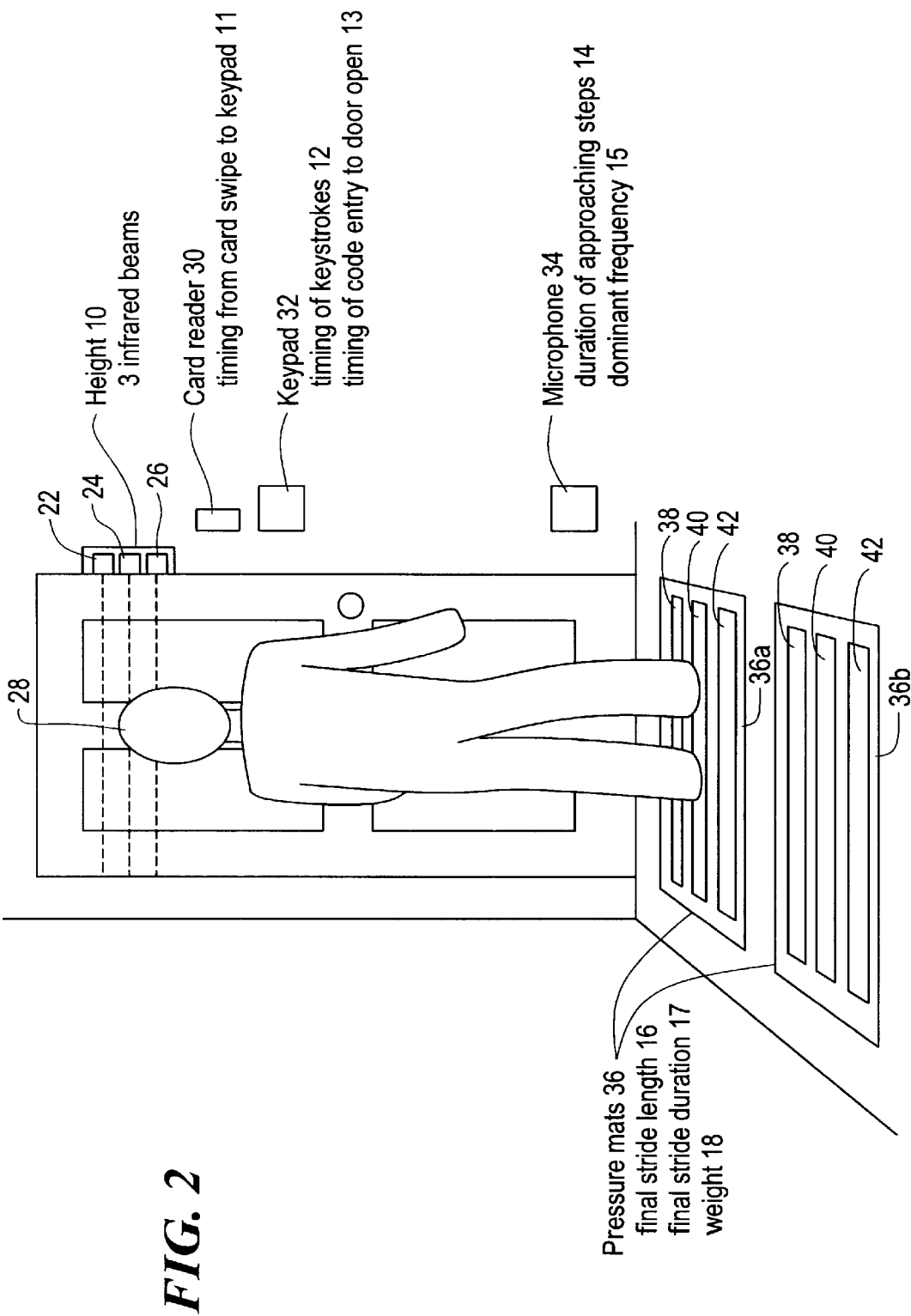
FIG. 2 is an application of the system for a door monitor.

A typical sensor setup is shown in FIG. 2. This drawing depicts an inexpensive system which could provide nine different criteria 10–18. Using four bins for each of the nine criteria would give a false positive rate of 3 out of 100,000. The sensors are all simple, and capable of inexpensive manufacture and installation. Various substitutions or omissions of different sensors can, of course, be provided to suit the desired application.

Height is derived from three IR beams 22, 24, 26 employing simple diodes and photo-transistors similar to those in a typical household TV remote control. An approaching subject 28 would block zero or more of the three beams depending on height, therefore providing four bins of height measurement. The illustrated subject 28 blocks two of the three beams, indicating the third bin of height (first bin representing the shortest group, i.e. no beams blocked).

The card reader 30 and keypad 32 provide a basis for multiple timings which will characterize behavioral traits such as the timing of keystrokes 12 and time between keycode entry and the opening of the door 13. Such timing data requires no additional hardware beyond the microprocessor clock already employed in keypad and card reader hardware.

An inexpensive microphone 34 yields information on pace, footwear typically worn, and similar information. Duration between noise bursts from footsteps 14 and dominant frequency 15, obtained via Fast Fourier Transform, can be efficiently performed with a typical PC.

Pressure mats 36 based on simple membrane switches, with different switch sets 38, 40, 42 closed by varying thresholds of applied pressure, can measure weight 18 to four bins using low pressure 38, medium pressure 40, and high pressure 42 segments similar to the height 10 bin selection above. Such pressure mats also measure length 16 and duration 17 of stride by aggregating measurements from a plurality 36a, 36b of pressure mats on the door approach.

Figure 3:
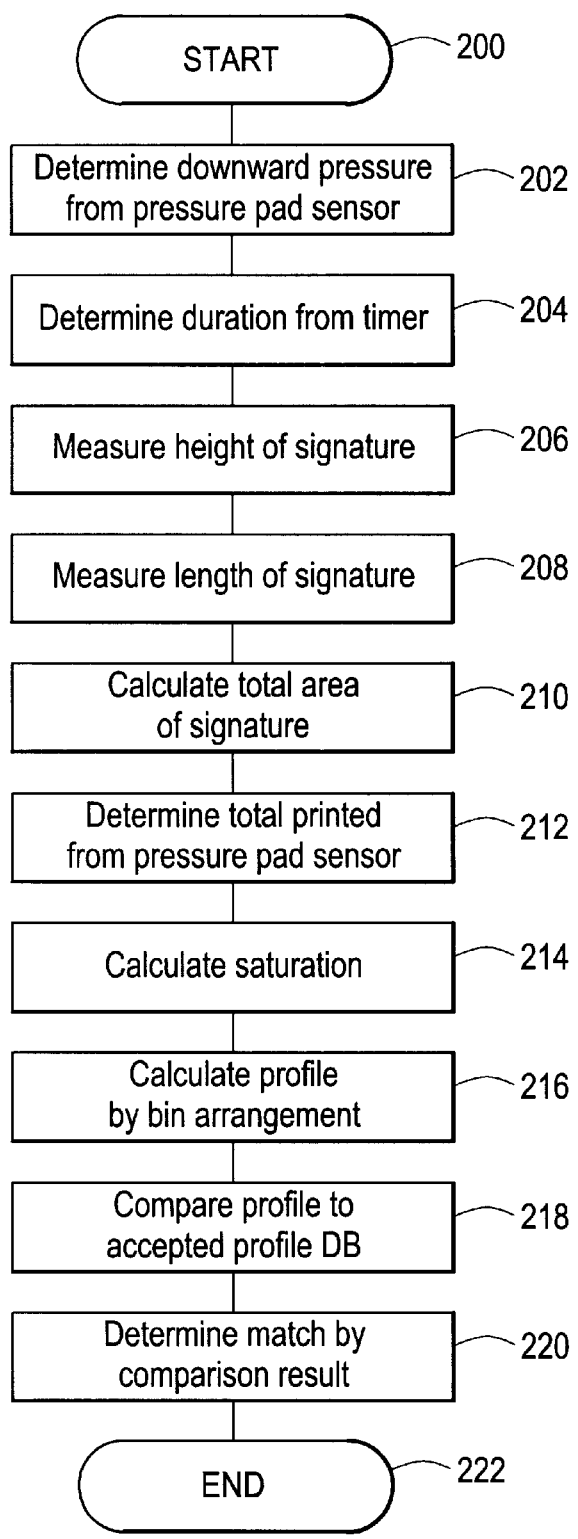
FIG. 3 is a flowchart of another embodiment of the system.

In another embodiment, defined by the flowchart in FIG. 3, the system is used for personal identification for check cashing and credit card validation. Stores which accept personal checks and credit cards as payment are always concerned about the identity of the purchaser. Information in the credit card magnetic strip about weight, coupled to a signature writing pressure mat offering three bins of resolution, could cut stolen card or check usage by approximately a factor of three. An easily obtained and economic measure of elapsed time to write a signature could reduce it to one in nine.

Referring to the flowchart in FIG. 3, a signature analysis embodiment is initiated 200. Downward pressure applied to the pen by the subject is measured at 202. Duration of signature writing defined by the elapsed time of contacting the pen to the pressure mat until removal is measured at 204. At 206, the height of the signature is measured from the extreme positions of the pen during the signature writing. At 208, the length of the signature is measured using the extreme positions along the lateral axis perpendicular to the axis in step 206. Total signature area is computed 210 using the criteria measured at steps 206 and 208. Total printed area is determined at step 212 from the area contacted by the pen. Saturation, or relative density of the printed area, is computed at 214 by dividing the total printed area by the total signature area. At 216, the subject profile is calculated by determining the bin placement of the signature values obtained in steps 202–214. The newly obtained subject profile is then compared to the accepted profile database 218 to determine if the signature of the subject matches 220, and verify the identity of the signer 222.

In another embodiment of the present invention, a learning feature is incorporated. Over time, it is likely that one or more criteria will shift, due to such factors as sensor drift and changing personal characteristics such as weight, of which the system must accept and adapt. An active agent architecture is used to support such learning. The system contains an active agent embodying the decision-making for all persons, and in particular for each person qualified for admission. This agent knows the profile of past readings for this person. It will accept a reading vector which matches exactly the known profile. It will also accept, conditionally, a reading vector which mismatches in only one criterion. If such a vector is presented repeatedly, it will accumulate internal pressure to change the known profile, to accept either value, or eventually only the new value. Pressure to change will build more quickly if other agents are experiencing drift with the same sensor. Many embodiments of the learning methodology are possible. For example, if the sensor set is large, more than one mismatch may be acceptable, or alternatively, a warning output may be created, where human guards are alerted in the event of a poor pattern match.

Alternative embodiments of the system include the following. In commercial buildings, such a system may be used in combination with a key-card and keypad for PIN entry in high security areas, or it may be used as a replacement for key cards in lower security applications, reducing the administrative costs associated with the maintenance of keycards. In residential applications, the system may be used to recognize authorized individuals as an alternative to traditional perimeter protection which typically involves many door and window sensors with attendant wiring. It may additionally be combined with a "smart house" system to adjust the environment to the preferences of the specific individual who has entered by evaluating activities such as lighting turned on in rooms, choice of background music, and other repetitive types of behavior.

An automobile alarm could be constructed which is wired to the same devices as a conventional alarm, but which uses sequences of action and timing information such as the time to get key in after opening door, time to fasten seat belt, turn on engine, time to release the brake and put car in gear, weight in seat, and habitual placement of briefcase in an adjacent seat. Such alternative embodiments would process sensor input similar to the block diagram and building application described above. Cost as compared to current high-end alarm systems would be minimal.

Quality control inspection systems can be implemented to facilitate inspection of quality parameters of manufactured goods. For example the quality of the paint finish on an automobile or white goods is a complex matter. But if reduced to an array of independent sensors, it can be thought of as a combination of uniformity of reflection, diffraction at different angles, and similar parameters which can be measured with very inexpensive electronics and optics, and compared to appropriate patterns.

The timing and sequence parameters described for the building key-pad and the automotive alarm can also be applied to computer and Internet access for criteria such as password entry speed, the sequence of file access which follows, and other manual entry tasks performed by subjects.

As various extensions and modifications will be apparent to those skilled in the art, the pattern recognition system as described herein is not intended to be limited except as provided by the following claims.

TABLE I

|    | 1 | 2 | 10 | 50 | 100 |
|---|---|---|---|---|---|
| 2 | 0.11111111 | 0.209876543 | 0.692053852 | 0.997230675 | 0.999992331 |
| 3 | 0.037037037 | 0.072702332 | 0.314360486 | 0.84847678 | 0.977040714 |
| 4 | 0.012345679 | 0.024538942 | 0.116819074 | 0.462660947 | 0.711266742 |
| 5 | 0.004115226 | 0.008213518 | 0.040398487 | 0.186318168 | 0.337921876 |
| 6 | 0.001371742 | 0.002741603 | 0.013633055 | 0.066331838 | 0.128263763 |
| 7 | 0.000457247 | 0.000914286 | 0.004563077 | 0.022608115 | 0.044705104 |
| 8 | 0.000152416 | 0.000304808 | 0.001523113 | 0.007592401 | 0.015127158 |
| 9 | 5.08053E45 | 0.000101608 | 0.000507936 | 0.002537104 | 0.005067771 |
| 10 | 1.69351E-05 | 3.38699E-5 | 0.000169338 | 0.000846403 | 0.00169209 |

TABLE II

|    | 1 | 2 | 10 | 50 | 100 |
|---|---|---|---|---|---|
| 2 | 0.0625 | 1.12109375 | 0.475539525 | 0.960320717 | 0.998425554 |
| 3 | 0.015625 | 0.031005859 | 0.14570915 | 0.544981794 | 0.792958433 |
| 4 | 0.00390625 | 0.007797241 | 0.038382958 | 0.1777369850 | 0.323883535 |
| 5 | 0.000976563 | 0.001952171 | 0.009722821 | 0.04767792 | 0.093082657 |
| 6 | 0.000244141 | 0.000488222 | 0.002438726 | 0.0122343 | 0.024121359 |
| 7 | 6.10352e-05 | 0.000122067 | 0.000610184 | 0.003047199 | 0.006085112 |
| 8 | 1.52588e-05 | 3.05173e-05 | 0.000152577 | 0.000762654 | 0.001524727 |
| 9 | 3.1847e-06 | 7.62938e-06 | 3.81463e-05 | 0.000190717 | 0.000381398 |
| 10 | 9.53674e-07 | 1.90735e-06 | 9.5367e-06 | 4.76826e-05 | 9.53629e-05 |

TABLE III

|    | 1         | 2           | 10          | 50          | 100         |
|----|-----------|-------------|-------------|-------------|-------------|
| 2  | 0.04      | 0.0784      | 0.335167364 | 0.870114206 | 0.983129681 |
| 3  | 0.008     | 0.015936    | 0.077180588 | 0.330757354 | 0.552114281 |
| 4  | 0.0016    | 0.00319744  | 0.01588529  | 0.076942794 | 0.147965395 |
| 5  | 0.00032   | 0.000639898 | 0.003195396 | 0.0158752   | 0.031498378 |
| 6  | 6.4E45    | 0.000127996 | 0.000639816 | 0.003194988 | 0.006379767 |
| 7  | 1.28E-5   | 2.55998E-05 | 0.000127993 | 0.000639799 | 0.001279189 |
| 8  | 2.56E-06  | 5.11999E-6  | 2.55997E-5  | 0.000127992 | 0.000255968 |
| 9  | 5.12E-07  | 1.024E-06   | 5.11999E-06 | 2.55997E05  | 5.11987E-05 |
| 10 | 1.024E-07 | 2.048E-07   | 1.024E-06   | 5.11999E-06 | 1.02399E-5  |

What is claimed is:

1. A detection system for analyzing personal behavioral traits and matching such traits with known trait profiles, comprising:
   a plurality of sensors, each monitoring a respective condition, having sensor output signals, each said output signal indicative of a subject criteria;
   a sensor reading repository connected to said plurality of sensors for storing a plurality of said sensor output signals;
   a profile generator, connected to said sensor reading repository, receiving said sensor output signals and generating a subject profile from said plurality of sensor output signals;
   an accepted profile repository for storing a plurality of accepted subject profiles;
   a profile verifier for receiving said subject profiles for comparing said subject profile to said plurality of accepted profiles, and for generating profile output signals in response to said comparing.

2. The system as in claim 1 further comprising:
   an output device interface for receiving said output signals;
   at least one output device connected to said profile verifier and adapted to respond to said output signals.

3. The system as in claim 1 further comprising:
   a graphical user interface connected to said profile verifier and adapted to respond to said profile verifier by generating output display signals.

4. The system as in claim 1 wherein said sensor reading repository further comprises a time stamp associated with each of said plurality of sensor output signals.

5. The system as in claim 1 wherein said profile verifier is operative to update said accepted profile repository in response to said comparison of said subject profile with said plurality of accepted subject profiles.

6. The system as in claim 5 wherein said update of said accepted profile repository is determined as a function of partial matching of said subject profile and said plurality of accepted profiles.

7. The system as in claim 1 further comprising a plurality of bins, wherein said sensor output signals indicative of said subject criteria are classified in said plurality of bins and said bins denote a predetermined range of said sensor output signals.

8. The system as in claim 7 wherein said each subject criteria is directed towards a separate quantifiable trait of said subject.

9. The system as in claim 8 wherein said sensor is an infrared beam.

10. The system as in claim 8 wherein said sensor has varied electric resistance in response to pressure.

11. The system as in claim 8 wherein said sensor reads magnetic pulses.

12. A method of matching patterns indicative of personal characteristic traits, comprising the steps of:
   reading a plurality of sensors each monitoring a respective condition;
   determining at least one criteria value from each said reading by a processor in communication with said plurality of sensors;
   storing said at least one criteria value in a sensor reading database associated with said processor;
   building a subject profile by said processor from said at least one criteria value;
   storing a plurality of accepted subject profiles in an accepted profile database; and
   comparing said subject profile to said plurality of accepted subject profiles in said accepted profile database.

13. The method as in claim 12 wherein said reading step further comprises calculating a time stamp and said storing step further comprises storing said time stamp in association with said reading.

14. The method as in claim 13 wherein said step of determining said at least one criteria value further comprises calculating a bin value, wherein said bin value denotes a subrange of values for said criteria.

15. The method as in claim 14 further comprising calculating a match value from said comparing of said subject profile and said accepted profile database.

16. The method as in claim 15 further comprising generating an output signal from said match value.

17. The method as in claim 16 further comprising an output device interface, said output device interface receiving said output signal and selectively manipulating an output device according to said output signal.

18. The method as in claim 15 wherein said subject profile is comprised of a series of said bin values for said at least one criteria value.

19. The method as in claim 18 wherein said step of determining said match value further comprises the steps of comparing said series of bin values to said series of accepted subject profiles in said accepted profile database.

20. The method as in claim 19 wherein said comparing of bin values occurs for each of said at least one criteria.

21. The method as in claim 20 wherein said comparing of bin values further comprises a tolerance threshold wherein said determining of said match value is computed as a function of said bin values differing by said tolerance threshold.

22. The method of claim 21 wherein said storing of said subject profile further includes updating a previously stored subject profile as a function of said readings stored in said sensor reading database, said at least one criteria value, and said previously stored subject profile.

23. The method as in claim 22 wherein said at least one criteria include height, weight, stride, pace, and speed.

24. The method as in claim 22 wherein said at least one criteria include handwriting height, width, pressure, duration, and saturation.

25. A method of matching patterns indicative of personal characteristic traits, comprising the steps of:

reading at least one sensor and calculating a time stamp for said reading;

determining at least one criteria value including handwriting height, width, pressure, duration and saturation from said reading by a processor in communication with said at least one sensor by calculating a bin value, wherein said bin value denotes a subrange of values for said criteria;

storing said at least one criteria value and said time stamp in a sensor reading database associated with said processor;

building a subject profile comprised of a series of said bin values for said at least one criteria value by said processor from said at least one criteria value;

storing an accepted subject profile by updating a previously stored accepted subject profile as a function of said readings stored in said sensor reading database, said at least one criteria value, and a previously stored accepted subject profile in a plurality of accepted subject profiles in an accepted profile database;

comparing said subject profile to said plurality of accepted subject profiles in said accepted profile database; and calculating a match value from said subject profile and said accepted profile database, comprising comparing said series of bin values for each of said at least one criteria to said series of accepted subject profiles in said accepted profile database, said calculating said match value is computed as a function of said bin values differing from said accepted profile database by a tolerance threshold.

* * * * *